United States Patent
Guo (10) Patent No.: US 9,906,297 B2
(45) Date of Patent: Feb. 27, 2018

(54) METHOD AND SYSTEM FOR IMPLEMENTING VISIBLE-LIGHT COMMUNICATION, SENDING APPARATUS, AND RECEIVING APPARATUS

(71) Applicant: ZTE CORPORATION, Shenzhen, Guangdong Province (CN)

(72) Inventor: Yang Guo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 210 days.

(21) Appl. No.: 14/889,442

(22) PCT Filed: Aug. 27, 2013

(86) PCT No.: PCT/CN2013/082353
§ 371 (c)(1),
(2) Date: Dec. 14, 2015

(87) PCT Pub. No.: WO2014/180080
PCT Pub. Date: Nov. 13, 2014

(65) Prior Publication Data
US 2016/0127039 A1  May 5, 2016

(30) Foreign Application Priority Data
May 9, 2013 (CN) .......................... 2013 1 0169108

(51) Int. Cl.
*H04B 10/11* (2013.01)
*H04B 10/116* (2013.01)
(Continued)

(52) U.S. Cl.
CPC ....... *H04B 10/116* (2013.01); *H04B 10/5561* (2013.01); *H04L 27/34* (2013.01)

(58) Field of Classification Search
CPC .... H04B 10/5561; H04B 10/116; H04L 27/34
(Continued)

(56) References Cited

U.S. PATENT DOCUMENTS 5,517,608 A * 5/1996 Suzuki ............... H04B 10/1143
398/156
5,917,634 A * 6/1999 Otobe ................. G02B 6/4204
250/574

(Continued)

FOREIGN PATENT DOCUMENTS

| CN | 101547182 A | 9/2009 |
| CN | 101714971 | 5/2010 |

(Continued)

OTHER PUBLICATIONS

Zhang et al, Optimal Power Allocation in Spatial Modulation OFDM for Visible Light Communications, May 2012, IEEE, All Document.*
Mesleh et al, Spatial Modulation, Jul. 2008, IEEE, All Document.*

*Primary Examiner* — Ken N Vanderpuye
*Assistant Examiner* — Dibson Sanchez
(74) *Attorney, Agent, or Firm* — Ling Wu; Stephen Yang; Ling and Yang Intellectual Property (57) ABSTRACT

A method and system for implementing visible light communication, a sending apparatus and a receiving apparatus are disclosed. The method includes: after performing constellation modulation on data to be sent, a sending end mapping a modulated signal to a corresponding luminescent light source and transmitting the data to be sent through an optical signal; a receiving end converting a received optical signal into an electrical signal, and determining a constellation modulation signal according to a luminescent light source corresponding to the received signal, and demodulating the constellation modulation signal to obtain received data.

18 Claims, 3 Drawing Sheets

(51) Int. Cl.
*H04B 10/556* (2013.01)
*H04L 27/34* (2006.01)

(58) Field of Classification Search
USPC .................................................. 398/118–131
See application file for complete search history.

(56) References Cited

U.S. PATENT DOCUMENTS

| | | | | |
|---|---|---|---|---|
| 9,418,115 B2* | 8/2016 | Ganick | ............ | G06F 17/30522 |
| 9,468,232 B2* | 10/2016 | DeGuzman | ............ | A24C 1/386 |
| 2006/0239689 A1* | 10/2006 | Ashdown | ........... | H04B 10/1141 398/130 |
| 2008/0310850 A1* | 12/2008 | Pederson | ........... | G07C 9/00158 398/135 |
| 2009/0028436 A1 | 1/2009 | Yoshino et al. | | |
| 2009/0208221 A1* | 8/2009 | Sasai | ................... | H04B 10/116 398/130 |
| 2009/0284366 A1 | 11/2009 | Haartsen et al. | | |
| 2010/0135673 A1* | 6/2010 | Son | .................... | H04B 10/1141 398/183 |
| 2010/0247112 A1* | 9/2010 | Chang | ................ | H04B 10/1149 398/182 |
| 2010/0322635 A1 | 12/2010 | Klinghult | | |
| 2013/0018558 A1* | 1/2013 | Ahn | .......................... | B60T 7/22 701/70 |
| 2013/0021326 A1 | 1/2013 | Tsai et al. | | |
| 2013/0126713 A1* | 5/2013 | Haas | ..................... | H04B 10/116 250/208.2 |
| 2013/0266314 A1* | 10/2013 | Lee | ..................... | H04B 10/2507 398/43 |
| 2014/0029952 A1* | 1/2014 | Liu | ....................... | H04B 10/116 398/115 |
| 2014/0099107 A1* | 4/2014 | Ravich | ................. | H04B 10/116 398/43 |
| 2014/0255038 A1* | 9/2014 | Richards, IV | ....... | H04B 10/116 398/118 |
| 2015/0318925 A1* | 11/2015 | Tsonev | ................. | H04B 10/116 398/79 |

FOREIGN PATENT DOCUMENTS

| | | |
|---|---|---|
| CN | 101826899 A | 9/2010 |
| CN | 101924722 A | 12/2010 |
| CN | 102394723 A | 3/2012 |
| CN | 102546077 A | 7/2012 |
| CN | 102656826 A | 9/2012 |
| CN | 102684819 A | 9/2012 |
| CN | 102904665 A | 1/2013 |
| JP | 2004201131 A | 7/2004 |
| WO | 2010103451 A1 | 9/2010 |
| WO | WO2012003856 A1 | 1/2012 |

\* cited by examiner

METHOD AND SYSTEM FOR IMPLEMENTING VISIBLE-LIGHT COMMUNICATION, SENDING APPARATUS, AND RECEIVING APPARATUS

TECHNICAL FIELD

The present document relates to the visible light communication technology, and particularly, to a method and system for implementing visible light communication, a sending apparatus and a receiving apparatus.

BACKGROUND OF THE RELATED ART

The wireless communication technology using the visible light has attracted attention from the academic circles and industrial circles in recent years. In particular, while the lighting equipment using light-emitting elements such as a light emitting diode (LED) and so on is widely used, the feasibility research on using a semiconductor LED to implement the visible light communication covered by the wireless communication network is ongoing. The appropriate approach of combining the visible light communication with a wireless sensor network, a wireless local area network (WLAN) and a power-line communication system is also in the discussion. It has been able to prove that such communication mode will be one of the alternative short-distance and ultra-wideband communication modes in the future.

As the light-emitting components used for the high-speed optical data communication, the influence on the human body or medical apparatus should be considered, and the LED has been regarded as the most powerful candidate light-emitting device at present. Meanwhile, in the optical communication, a data rate is dependent on a response speed of the light-emitting device. Therefore, a light-emitting device with the higher-speed response performance such as a laser diode (LD) or a super luminescent diode (SLD) also attracts much attention.

The basic principle of implementing the visible light communication is that: a certain kind of modulation such as pulse width modulation (PWM), pulse position/frequency modulation (PPM) or pulse amplitude modulation (PAM) is performed on the light emitted by the light-emitting device; the modulated light energy is used as data to be transmitted, and transmitted through a spatial channel and received by a photoelectric detector (a sensor) on the target device; and the photoelectric detector converts the received optical signal into an electrical signal and then demodulates the sent data through the follow-up processing. The target device can be a common portable device attached with such function of transmitting the data through the visible light, such as a mobile phone, a digital camera and a notebook computer and so on. Similar to the constitution of the wireless local area network, the portable terminals constitute the nodes in the network, that is, the visible light communication technology can serve as the local area network technology or the underlying technology applied in an access network.

According to the future application scenarios and characteristics of the visible light, the multiple input multiple output (MIMO) may become the mainstream application mode in various scenarios. Moreover, there will be more and more various portable devices equipped with cameras. It is not difficult to imagine that using various LEDs as an information releasing system and various portable/mobile terminals as a receiving system is a simple and convenient communication mode. At present, there has been no specific method for implementing the visible light communication in the industry.

SUMMARY

The present document provides a method and system for implementing visible light communication, a sending apparatus and a receiving apparatus, which can implement the visible light communication, to meet the demand for application scenarios of the visible light in the future.

In order to solve the above technical problem, the present document discloses a method for implementing visible light communication, which comprises: after performing constellation modulation on data to be sent, a sending end mapping a modulated signal to a corresponding luminescent light source; and transmitting the data to be sent to a receiving end through an optical signal, and the receiving end converting the received optical signal into an electrical signal; and the receiving end determining a constellation modulation signal according to a luminescent light source corresponding to the received signal, and demodulating the constellation modulation signal to obtain received data.

Preferably, before the method, it further comprises: performing encoding on the data to be sent, and performing constellation modulation on an encoded signal.

Preferably, before the method, it further comprises: pre-setting a mapping relationship between a constellation modulation signal and a location where the luminescent light source is located;

said mapping a modulated signal to a corresponding luminescent light source comprises: mapping a signal of a constellation point on which the constellation modulation is performed to a luminescent light source corresponding to the constellation point, according to the mapping relationship.

Preferably, said transmitting the data to be sent to a receiving end through an optical signal comprises: opening the corresponding luminescent light source, and transmitting the data to be sent to the receiving end through the optical signal.

Preferably, said opening the corresponding luminescent light source comprises: driving the electrical signal on which the constellation modulation is performed, and opening a luminescent light source on a constellation point corresponding to the modulated signal.

Preferably, after the receiving end converts the received optical signal into the electrical signal, the method further comprises: performing filter shaping processing on the electrical signal obtained through the conversion.

Preferably, when the receiving end is started, the method further comprises: pre-positioning a location of the luminescent light source in a constellation diagram.

Preferably, the pre-positioning comprises: the sending end simultaneously opening all luminescent light sources corresponding to constellation modulation in different modulation modes, or simultaneously opening luminescent light sources in part of particular locations; and the receiving end identifying a location of each luminescent light source corresponding to each constellation point in different modulation modes by positioning a light source matrix, and establishing a mapping relationship between a constellation modulation signal and a location where the luminescent light source is located consistent with that of the sending end.

Preferably, determining a constellation modulation signal according to the luminescent light source corresponding to the received signal comprises: according to the established mapping relationship, mapping a location of the luminescent light source where the received optical signal is located to a constellation modulation signal corresponding to the constellation point.

The present document further provides a system for implementing visible light communication, which comprises: a sending end and a receiving end;

the sending end is configured to: after performing constellation modulation on data to be sent, map a modulated signal to a corresponding luminescent light source; and transmit the data to be sent to the receiving end through an optical signal; and the receiving end is configured to: receive the optical signal from the sending end and convert the optical signal into an electrical signal; and determine a constellation modulation signal according to a luminescent light source corresponding to the received signal, and demodulate the constellation modulation signal to obtain received data.

Preferably, the sending end at least comprises: a signal preprocessing unit, a mapping unit and a signal output unit, wherein, the signal preprocessing unit is configured to: perform preprocessing on the data to be sent and then output the preprocessed data to be sent to the mapping unit, wherein the preprocessing comprises encoding and constellation modulation;

the mapping unit is configured to: be set with a mapping relationship between a constellation modulation signal and a location where the luminescent light source is located;

and map the modulated signal to the corresponding luminescent light source according to the set mapping relationship and then output the modulated signal to the signal output unit; and the signal output unit is configured to: convert an electrical signal from the mapping unit into an optical signal, and transmit the optical signal obtained through the conversion to the receiving end.

Preferably, the luminescent light source is independent, or is a luminescent point independently opened in a luminescent panel.

Preferably, the receiving terminal at least comprises: a signal receiving unit, an inverse mapping unit and a signal processing unit, wherein, the signal receiving unit is configured to: convert the optical signal from the sending end into the electrical signal and then output the electrical signal to the inverse mapping unit;

the inverse mapping unit is configured to: according to an established mapping relationship between a constellation modulation signal and a location where the luminescent light source is located, map a location of the luminescent light source where the received optical signal is located into a constellation modulation signal corresponding to a constellation point, and output the obtained constellation modulation signal to the signal processing unit; and the signal processing unit is configured to: perform processing on the constellation modulation signal from the inverse mapping unit to obtain the data sent by the sending end; wherein the processing comprises modulation and decoding.

The signal receiving unit is further configured to: perform filter shaping processing on the received optical signal.

The sending end is further configured to: simultaneously open all luminescent light sources corresponding to constellation modulation in different modulation modes, or simultaneously open luminescent light sources in part of particular locations;

the receiving end is further configured to: identify a location of each luminescent light source corresponding to each constellation point in different modulation modes by positioning a light source matrix, and establish a mapping relationship between a constellation modulation signal and a location where the luminescent light source is located consistent with that of the sending end.

Preferably, when the constellation modulation is quaternary phase shift keying (QPSK) signal modulation, a number of the luminescent light sources is 4;

when the constellation modulation is quadrature amplitude modulation with 16 kinds of symbols (16QAM), a number of the luminescent light sources is 16; and when the constellation modulation is quadrature amplitude modulation with 64 kinds of symbols (64QAM), a number of the luminescent light sources is 64.

The present document further provides a sending apparatus, which is configured to: after performing constellation modulation on data to be sent, map a modulated signal to a corresponding luminescent light source; and send the data to be sent through an optical signal.

Preferably, the sending apparatus at least comprises: a signal preprocessing unit, a mapping unit and a signal output unit, wherein, the signal preprocessing unit is configured to: perform preprocessing on the data to be sent and then output the preprocessed data to be sent to the mapping unit, wherein the preprocessing comprises encoding and constellation modulation;

the mapping unit is configured to: be set with a mapping relationship between a constellation modulation signal and a location where the luminescent light source is located; and map the modulated signal to the corresponding luminescent light source according to the set mapping relationship and then output the modulated signal to the signal output unit; and the signal output unit is configured to: convert an electrical signal from the mapping unit into an optical signal, and transmit the optical signal obtained through the conversion to a receiving end.

Preferably, the sending apparatus is further configured to: simultaneously open all luminescent light sources corresponding to constellation modulation in different modulation mode, or simultaneously open luminescent light sources in part of particular locations.

When the constellation modulation is quaternary phase shift keying (QPSK) signal modulation, a number of the luminescent light sources is 4;

when the constellation modulation is quadrature amplitude modulation with 16 kinds of symbols (16QAM), a number of the luminescent light sources is 16; and when the constellation modulation is quadrature amplitude modulation with 64 kinds of symbols (64QAM), a number of the luminescent light sources is 64.

The present document further provides a receiving apparatus, which is configured to: convert a received optical signal into an electrical signal; and determine a constellation modulation signal according to a luminescent light source corresponding to the received signal, and demodulate the constellation modulation signal to obtain received data.

Preferably, the receiving apparatus at least comprises: a signal receiving unit, an inverse mapping unit and a signal processing unit, wherein, the signal receiving unit is configured to: convert an optical signal from a sending end into an electrical signal and then output the electrical signal to the inverse mapping unit;

the inverse mapping unit is configured to: according to an established mapping relationship between a constellation modulation signal and a location where the luminescent light source is located, map a location of the luminescent light source where the received optical signal is located to a constellation modulation signal corresponding to a constellation point, and output the obtained constellation modulation signal to the signal processing unit; and the signal processing unit is configured to: perform processing on the constellation modulation signal from the inverse mapping unit to obtain the data sent by the sending end; wherein the processing comprises modulation and decoding.

Preferably, the signal receiving unit is further configured to: perform filter shaping processing on the received optical signal.

Preferably, the receiving apparatus is further configured to: identify a location of each luminescent light source corresponding to each constellation point in different modulation modes by positioning a light source matrix, and establish a mapping relationship between a constellation modulation signal and a location where the luminescent light source is located consistent with that of a sending apparatus.

The technical scheme of the present application comprises: after performing constellation modulation on data to be sent, a sending end mapping a modulated signal to a corresponding luminescent light source; and transmitting the data to be sent to a receiving end through an optical signal, and the receiving end converting a received optical signal into an electrical signal; and the receiving end determining a constellation modulation signal according to a luminescent light source corresponding to the received signal, and demodulating the constellation modulation signal to obtain received data. In the method of the embodiment of the present document, the sending end places light sources of the visible light according a constellation diagram form of the constellation modulation, and maps the signal obtained after the constellation modulation is performed on the data to be sent to a luminescent light source corresponding to the location of the constellation point and drives the luminescent light source, thereby transmitting the data to be sent to the receiving end through the optical signal; and the receiving terminal determines a constellation modulation signal corresponding to the constellation point according to the location of the luminescent light source, to acquire the data from the sending end. With the above method, the visible light communication is implemented, which meets the demand for application scenarios of the visible light in the future.

BRIEF DESCRIPTION OF DRAWINGS

Here, the described accompanying drawings are used to provide a further understanding of the present document and constitute a part of the present application. The schematic embodiments and illustrations thereof of the present document are used to explain the present document, but do not constitute an inappropriate limitation on the present document. In the drawings.

PREFERRED EMBODIMENTS OF THE INVENTION

Figure 1:
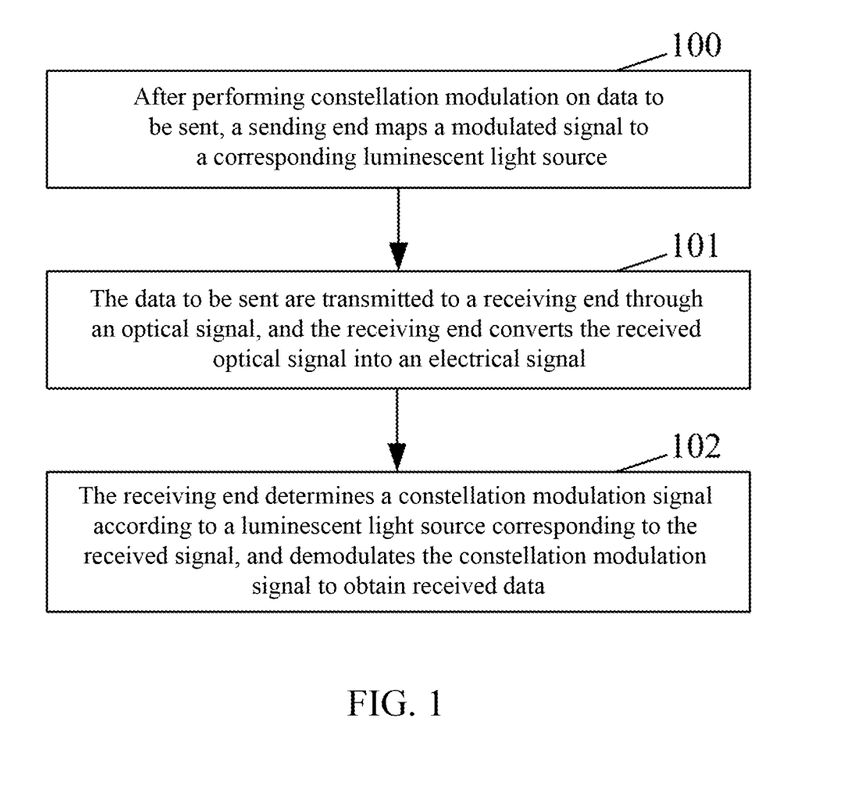
FIG. 1 is a flow chart of a method for implementing visible light communication according to the embodiment of the present document.

FIG. 1 is a flow chart of a method for implementing visible light communication according to the present document, and as shown in FIG. 1, the following steps are included.

In step 100, after performing constellation modulation on data to be sent, a sending end maps a modulated signal to a corresponding luminescent light source.

In the step, luminescent light sources of the visible light are placed in simulation to the form of locations of the constellation points after the constellation modulation is performed, and a mapping relationship between a constellation modulation signal and a location where the luminescent light source is located is preset. According to characteristics of the constellation modulation, for example, when a quaternary phase shift keying (QPSK) signal is a 2 bit byte and QPSK modulation is adopted, 4 constellation points can be generated, and thus 4 luminescent light sources are required to correspond to the 4 constellation points respectively; for another example, when quadrature amplitude modulation with 16 kinds of symbols (16QAM) is a 4 bit byte and the 16QAM modulation is adopted, 16 constellation points can be generated, and thus 16 luminescent light sources are required to correspond to the 16 constellation points respectively; and for another example, when quadrature amplitude modulation with 64 kinds of symbols (64QAM) is a 6 bit byte and the 64QAM modulation is adopted, 64 constellation points can be generated, and thus 64 luminescent light sources are required to correspond to the 64 constellation points respectively, and so forth. It is not difficult to understand that other constellation modulation is on the analogy of this: $2^n$ luminescent light sources can transmit n-byte constellation modulation information at each moment, and during the data transmission, the luminescent light source corresponding to only one constellation point is opened at each moment.

Figure 2:
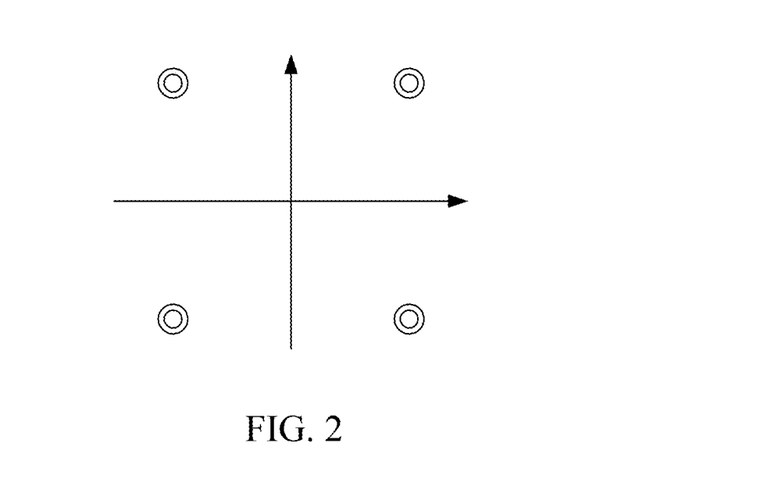
FIG. 2 is a first implementation schematic diagram of a corresponding relationship between locations of light sources and a constellation diagram according to the present document.
Figure 3:
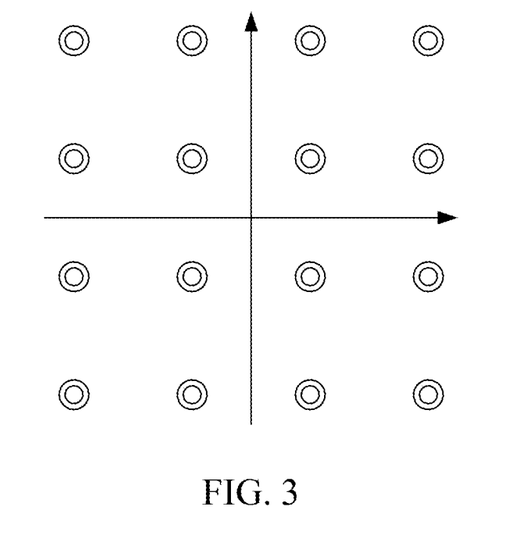
FIG. 3 is a second implementation schematic diagram of a corresponding relationship between locations of light sources and a constellation diagram according to the present document.
Figure 4:
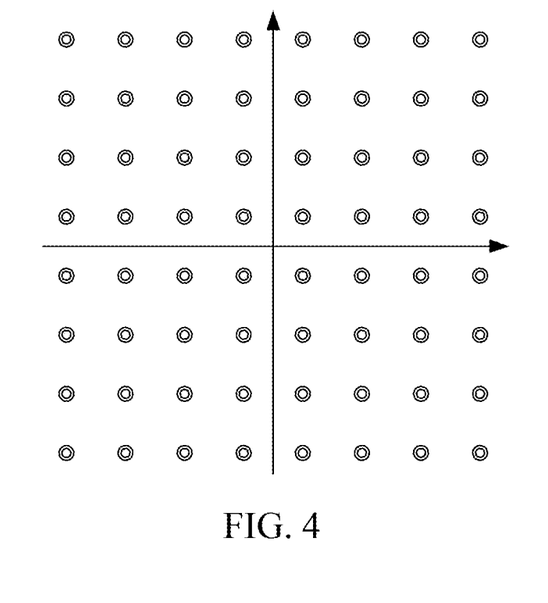
FIG. 4 is a third implementation schematic diagram of a corresponding relationship between locations of light sources and a constellation diagram according to the present document.

For example, FIG. 2 is a first implementation schematic diagram of a corresponding relationship between locations of light sources and a constellation diagram according to the present document, the constellation modulation is the QPSK modulation in FIG. 2, the placement locations of the luminescent light sources are as shown in FIG. 2, and double-loop circles represent 4 luminescent light sources respectively corresponding to different constellation points in the FIG. 2. FIG. 3 is a second implementation schematic diagram of a corresponding relationship between locations of light sources and a constellation diagram according to the present document, the constellation modulation is the 16QAM modulation in FIG. 3, the placement locations of the luminescent light sources are as shown in FIG. 3, and double-loop circles represent 16 luminescent light sources respectively corresponding to different constellation points in the FIG. 3. FIG. 4 is a third implementation schematic diagram of a corresponding relationship between locations of light sources and a constellation diagram according to the present document, the constellation modulation is the 64QAM modulation in FIG. 4, the placement locations of the luminescent light sources are as shown in FIG. 4, and double-loop circles represent 64 luminescent light sources respectively corresponding to different constellation points in the FIG. 4.

Wherein, each luminescent light source can be independent, and it also can be a luminescent point that can be independently opened in a luminescent panel. It should be noted that a separation distance between the luminescent points is required to satisfy that the receiving end can identify different luminescent points, and with respect to how to specifically determine the separation distance between the luminescent points, it should be easily implemented by the people skilled in the art according to the actual conditions, which is not limited here.

In the step, mapping the modulated signal to the corresponding luminescent light source includes: according to the preset mapping relationship between the constellation modulation signal and the location where the luminescent light source is located, mapping a signal of a constellation point on which the constellation modulation is currently performed to a luminescent light source corresponding to the constellation point. After the constellation modulation is performed, a throughput of transmitting data streams becomes n times of not performing the constellation modulation.

In the step, before performing constellation modulation on the data to be sent, it further includes: performing encoding on the data to be sent, and performing constellation modulation on an encoded signal. Wherein, the specific implementation of the encoding and constellation modulation belongs to the common technical means of the people skilled in the art, which will not be repeated here.

In step 101, the data to be sent are transmitted to a receiving end through an optical signal, and the receiving end converts the received optical signal into an electrical signal.

In the step, transmitting the data to be sent to the receiving end through the optical signal includes: opening the corresponding luminescent light source, and transmitting the data to be sent to the receiving end through the optical signal. Wherein, opening the corresponding luminescent light source specifically includes: driving the electrical signal on which the constellation modulation is performed, and opening a luminescent light source on a constellation point corresponding to the modulated signal, thereby completing a conversion from the electrical signal to the optical signal.

The receiving terminal converting the received optical signal into the electrical signal belongs to the common technical means of the people skilled in the art, and the specific implementation thereof is not used to limit the protection scope of the present document, which will not be repeated here.

In the step, after the receiving terminal converts the received optical signal into the electrical signal, it further includes: performing filter shaping processing on the electrical signal obtained through conversion. The specific implementation belongs to the common technical means of the people skilled in the art, which is not used to limit the protection scope of the present document, and will not be repeated here.

In step 102, the receiving end determines a constellation modulation signal according to a luminescent light source corresponding to the received signal, and demodulates the constellation modulation signal to obtain received data.

Before the step, when the receiving end equipment is started, the method also includes: pre-positioning a location of the luminescent light source in a constellation diagram. That is to say, before the communication, the sending end simultaneously opens all luminescent light sources corresponding to constellation modulation in different modulation modes (or simultaneously opens luminescent light sources in part of particular locations), and the receiving end identifies a location of each luminescent light source corresponding to each constellation point in different modulation modes by positioning a light source matrix, thereby establishing a mapping relationship between a constellation modulation signal and a location where the luminescent light source is located consistent with that of the sending end at the receiving end. Therefore, determining the constellation modulation signal according to the luminescent light source corresponding to the received signal in the step includes: mapping a location of the luminescent light source where the received optical signal is located to a constellation modulation signal corresponding to the constellation point according to the established mapping relationship between the constellation modulation signal and the location where the luminescent light source is located.

In the step, processing including demodulation and decoding, etc., is performed on the mapped constellation modulation signal on the constellation point to obtain the received data. The specific implementation belongs to the common technical means of the people skilled in the art, which will not be repeated here.

In the method of the present document, the sending end places light sources of the visible light according a constellation diagram form of the constellation modulation, and maps the signal obtained after the constellation modulation is performed on the data to be sent to a luminescent light source corresponding to the location of the constellation point and drives the luminescent light source, thereby transmitting the data to be sent to the receiving end through the optical signal; and the receiving terminal determines a constellation modulation signal corresponding to the constellation point according to the location of the luminescent light source, to acquire the data from the sending end. Through the method of the present document, the visible light communication is implemented, which meets the demand for application scenarios of the visible light in the future.

Figure 5:
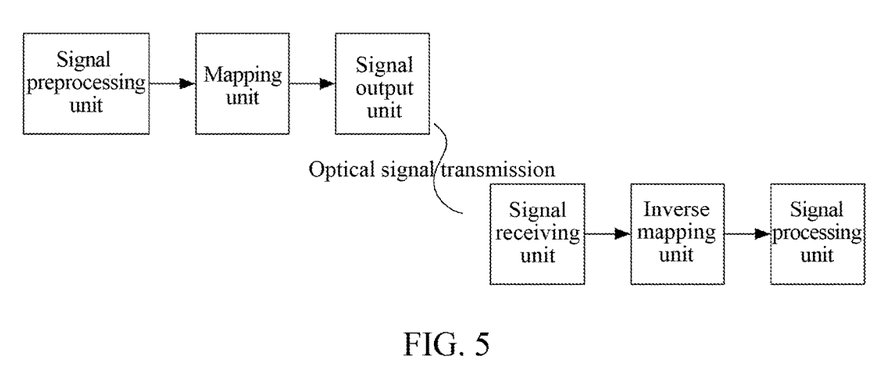
FIG. 5 is a schematic diagram of a composition structure of a system for implementing visible light communication according to the embodiment of the present document.

The present document also provides a system for implementing visible light communication, and as shown in FIG. 5, a sending end and a receiving end are included, wherein, the sending end is configured to: after performing constellation modulation on data to be sent, map a modulated signal to a corresponding luminescent light source; and transmit the data to be sent to the receiving end through an optical signal; and the receiving end is configured to: receive the optical signal from the sending end and convert the optical signal into an electrical signal; and determine a constellation modulation signal according to a luminescent light source corresponding to the received signal, and demodulate the constellation modulation signal to obtain received data.

The sending end at least includes: a signal preprocessing unit, a mapping unit and a signal output unit, wherein, the signal preprocessing unit is configured to: perform preprocessing on the data to be sent and then output the data to be sent to the mapping unit, wherein the preprocessing can include encoding and constellation modulation;

the mapping unit, in which a mapping relationship between a constellation modulation signal and a location where the luminescent light source is located is set, is configured to: according to the set mapping relationship, map the modulated signal to the corresponding luminescent light source and then output the modulated signal to the signal output unit; and the signal output unit is configured to: convert an electrical signal from the mapping unit into an optical signal, and transmit the optical signal obtained through conversion to the receiving end.

Wherein, each luminescent light source can be independent, and it also can be a luminescent point that can be independently opened in a luminescent panel. It should be noted that a separation distance between the luminescent points is required to satisfy that the receiving end can identify different luminescent points, and with respect to how to specifically determine the separation distance between the luminescent points, it should be easily implemented by the people skilled in the art according to the actual conditions, which is not limited here.

The receiving terminal at least includes: a signal receiving unit, an inverse mapping unit and a signal processing unit, wherein, the signal receiving unit is configured to: convert the optical signal from the sending end into the electrical signal and then output the electrical signal to the inverse mapping unit; and it is further configured to perform filter shaping processing on the received optical signal.

The inverse mapping unit is used to: according to an established mapping relationship between a constellation modulation signal and a location where the luminescent light source is located, map a location of the luminescent light source where the received optical signal is located to a constellation modulation signal corresponding to a constellation point, and output the obtained constellation modulation signal to the signal processing unit; and the signal processing unit is configured to: perform processing on the constellation modulation signal from the inverse mapping unit to obtain the data sent by the sending end. The processing therein includes modulation and decoding and so on.

Furthermore, the sending end is also configured to: simultaneously open all luminescent light sources corresponding to constellation modulation in different modulation modes, or simultaneously open luminescent light sources in part of particular locations;

the receiving end is also configured to: identify a location of each luminescent light source corresponding to each constellation point in different modulation modes by positioning a light source matrix, and establish a mapping relationship between a constellation modulation signal and a location where the luminescent light source is located consistent with that of the sending end. It should be noted that, in order to perform location calibration, such as a plurality of location possibilities corresponding to the QPSK, 16QAM and 64QAM modulation modes shown in FIG. 2 to FIG. 4, the receiving end is just required to identify the location by positioning the light source matrix. The specific implementation belongs to the common knowledge of the people skilled in the art, which is not used to limit the protection scope of the present document.

When the constellation modulation is quaternary phase shift keying (QPSK) signal modulation, the number of the luminescent light sources is 4; when the constellation modulation is quadrature amplitude modulation with 16 kinds of symbols (16QAM), the number of the luminescent light sources is 16; and when the constellation modulation is quadrature amplitude modulation with 64 kinds of symbols (64QAM), the number of the luminescent light sources is 64.

The present document also provides a sending apparatus for implementing visible light communication, which is configured to: after performing constellation modulation on data to be sent, map a modulated signal to a corresponding luminescent light source; and send the data to be sent by means of optical signal. A signal preprocessing unit, a mapping unit and a signal output unit are at least included, wherein, the signal preprocessing unit is configured to: perform preprocessing on the data to be sent and then output the data to be sent to the mapping unit, wherein the preprocessing can include encoding and constellation modulation;

the mapping unit, in which a mapping relationship between a constellation modulation signal and a location where the luminescent light source is located is set, is configured to: map the modulated signal to the corresponding luminescent light source according to the set mapping relationship and then output the modulated signal to the signal output unit; and the signal output unit is configured to: convert an electrical signal from the mapping unit into an optical signal, and transmit the optical signal obtained through conversion to a receiving end.

The sending apparatus is also configured to: simultaneously open all luminescent light sources corresponding to constellation modulation in different modulation modes, or simultaneously open luminescent light sources in part of particular locations.

The present document also provides a receiving apparatus for implementing visible light communication, which is configured to: convert a received optical signal into an electrical signal; and determine a constellation modulation signal according to a luminescent light source corresponding to the received signal, and demodulate the constellation modulation signal to obtain received data. A signal receiving unit, an inverse mapping unit and a signal processing unit are at least included, wherein, the signal receiving unit is configured to: convert an optical signal from a sending end into an electrical signal and then output the electrical signal to the inverse mapping unit; and it is further configured to perform filter shaping processing on the received optical signal.

The inverse mapping unit is configured to: according to an established mapping relationship between a constellation modulation signal and a location where the luminescent light source is located, map a location of the luminescent light source where the received optical signal is located to a constellation modulation signal corresponding to a constellation point, and output the obtained constellation modulation signal to the signal processing unit; and the signal processing unit is configured to: perform processing on the constellation modulation signal from the inverse mapping unit to obtain the data sent by the sending end. The processing therein includes modulation and decoding and so on.

The receiving apparatus is also configured to: by recording a location of each luminescent light source corresponding to each constellation point in different modulation modes, establish a mapping relationship between a constellation modulation signal and a location where the luminescent light source is located consistent with that of the sending apparatus.

The above description is only the preferred embodiments of the present document, which is not used to limit the protection scope of the present document. All the modifications, equivalent substitutions, and improvements, etc. made within the spirit and principle of the present document shall fall into the protection scope of the present document.

INDUSTRIAL APPLICABILITY

In the method of the embodiment of the present document, the sending end places light sources of the visible light according a constellation diagram form of the constellation modulation, and maps the signal obtained after the constellation modulation is performed on the data to be sent to a luminescent light source corresponding to the location of the constellation point and drives the luminescent light source, thereby transmitting the data to be sent to the receiving end through the optical signal; and the receiving terminal determines a constellation modulation signal corresponding to the constellation point according to the location of the luminescent light source, to acquire the data from the sending end. With the above method, the visible light communication is implemented, which meets the demand for application scenarios of the visible light in the future.

What is claimed is:

1. A method for implementing visible light communication, comprising: after performing constellation modulation on data to be sent, a sending end mapping a modulated signal to a corresponding luminescent light source; and
    transmitting the data to be sent to a receiving end through an optical signal, and the receiving end converting the received optical signal into an electrical signal; and
    the receiving end determining a constellation modulation signal according to a luminescent light source corresponding to the received signal, and demodulating the constellation modulation signal to obtain received data;
    wherein, before the method, the following is further comprised: presetting a mapping relationship between the constellation modulation signal and a location where the luminescent light source is located; wherein the luminescent light source is placed according to a constellation diagram form of the constellation modulation;
    said mapping a modulated signal to a corresponding luminescent light source comprises: mapping a signal of a constellation point on which the constellation modulation is performed to a luminescent light source corresponding to the constellation point according to the mapping relationship.

2. The method according to claim 1, wherein, before the method, the following is further comprised: performing encoding on the data to be sent, and performing constellation modulation on an encoded signal.

3. The method according to claim 1, wherein, said transmitting the data to be sent to a receiving end through an optical signal comprises: opening the corresponding luminescent light source, and transmitting the data to be sent to the receiving end through the optical signal.

4. The method according to claim 3, wherein, said opening the corresponding luminescent light source comprises: driving an electrical signal on which the constellation modulation is performed, and opening a luminescent light source on a constellation point corresponding to the modulated signal.

5. The method according to claim 1, wherein, after the receiving end converts the received optical signal into the electrical signal, the method further comprises: performing filter shaping processing on the electrical signal obtained through the conversion.

6. The method according to claim 5, wherein, when the receiving end is started, the method further comprises: pre-positioning a location of the luminescent light source in a constellation diagram.

7. The method according to claim 6, wherein, the pre-positioning comprises: the sending end simultaneously opening all luminescent light sources corresponding to constellation modulation in different modulation modes, or simultaneously opening luminescent light sources in part of particular locations; and
    the receiving end identifying a location of each luminescent light source corresponding to each constellation point in different modulation modes by positioning a light source matrix, and establishing a mapping relationship between a constellation modulation signal and a location where the luminescent light source is located consistent with that of the sending end.

8. The method according to claim 7, wherein, said determining a constellation modulation signal according to a luminescent light source corresponding to the received signal comprises: according to the established mapping relationship, mapping a location of the luminescent light source where the received optical signal is located to a constellation modulation signal corresponding to the constellation point.

9. A system for implementing visible light communication, comprising: a sending end and a receiving end; wherein
    the sending end is configured to: after performing constellation modulation on data to be sent, map a modulated signal to a corresponding luminescent light source; and transmit the data to be sent to the receiving end through an optical signal; and
    the receiving end is configured to: receive the optical signal from the sending end and convert the optical signal into an electrical signal; and determine a constellation modulation signal according to a luminescent light source corresponding to the received signal, and demodulate the constellation modulation signal to obtain received data;
    wherein, the sending end at least comprises: a signal preprocessing unit, a mapping unit and a signal output unit,
    wherein, the signal preprocessing unit is configured to: perform preprocessing on the data to be sent and then output the preprocessed data to be sent to the mapping unit, wherein the preprocessing comprises encoding and constellation modulation;
    the mapping unit is configured to: be set with a mapping relationship between a constellation modulation signal and a location where the luminescent light source is located; and according to the set mapping relationship, map the modulated signal to the corresponding luminescent light source and then output the modulated signal to the signal output unit wherein the luminescent light source is placed according to a constellation diagram form of the constellation modulation; and
    the signal output unit is configured to: convert an electrical signal from the mapping unit into an optical signal, and transmit the optical signal obtained through the conversion to the receiving end.

10. The system according to claim 9, wherein, the luminescent light source is independent, or is a luminescent point independently opened in a luminescent panel.

11. The system according to claim 10, wherein, when the constellation modulation is quaternary phase shift keying (QPSK) signal modulation, a number of the luminescent light sources is 4;
when the constellation modulation is quadrature amplitude modulation with 16 kinds of symbols (16QAM), a number of the luminescent light sources is 16; and
when the constellation modulation is quadrature amplitude modulation with 64 kinds of symbols (64QAM), a number of the luminescent light sources is 64.

12. The system according to claim 9, wherein, the receiving end at least comprises: a signal receiving unit, an inverse mapping unit and a signal processing unit, wherein,
the signal receiving unit is configured to: convert the optical signal from the sending end into the electrical signal and then output the electrical signal to the inverse mapping unit;
the inverse mapping unit is configured to: according to an established mapping relationship between a constellation modulation signal and a location where the luminescent light source is located, map a location of the luminescent light source where the received optical signal is located to a constellation modulation signal corresponding to a constellation point, and output the obtained constellation modulation signal to the signal processing unit; and
the signal processing unit is configured to: perform processing on the constellation modulation signal from the inverse mapping unit to obtain the data sent by the sending end; wherein the processing comprises modulation and decoding.

13. The system according to claim 12, wherein, the signal receiving unit is further configured to: perform filter shaping processing on the received optical signal.

14. The system according to claim 9, wherein, the sending end is further configured to: simultaneously open all luminescent light sources corresponding to constellation modulation in different modulation modes, or simultaneously open luminescent light sources in part of particular locations;
the receiving end is further configured to: identify a location of each luminescent light source corresponding to each constellation point in different modulation modes by positioning a light source matrix, and establish a mapping relationship between a constellation modulation signal and a location where the luminescent light source is located consistent with that of the sending end.

15. A sending apparatus, configured to: after performing constellation modulation on data to be sent, map a modulated signal to a corresponding luminescent light source; and send the data to be sent through an optical signal;
wherein, the sending apparatus at least comprises: a signal preprocessing unit, a mapping unit and a signal output unit, wherein,
the signal preprocessing unit is configured to: perform preprocessing on the data to be sent and then output the preprocessed data to be sent to the mapping unit, wherein the preprocessing comprises encoding and constellation modulation;
the mapping unit is configured to: be set with a mapping relationship between a constellation modulation signal and a location where the luminescent light source is located; and map the modulated signal to the corresponding luminescent light source according to the set mapping relationship, and then output the modulated signal to the signal output unit wherein the luminescent light source is placed according to a constellation diagram form of the constellation modulation; and
the signal output unit is configured to: convert an electrical signal from the mapping unit into an optical signal, and transmit the optical signal obtained through the conversion to a receiving end.

16. The sending apparatus according to claim 15,
wherein, the sending apparatus is further configured to: simultaneously open all luminescent light sources corresponding to constellation modulation in different modulation modes, or simultaneously open luminescent light sources in part of particular locations,
wherein, when the constellation modulation is quaternary phase shift keying (QPSK) signal modulation, a number of the luminescent light sources is 4;
when the constellation modulation is quadrature amplitude modulation with 16 kinds of symbols (16QAM), a number of the luminescent light sources is 16; and
when the constellation modulation is quadrature amplitude modulation with 64 kinds of symbols (64QAM), a number of the luminescent light sources is 64.

17. A receiving apparatus, configured to: convert a received optical signal into an electrical signal; and determine a constellation modulation signal according to a luminescent light source corresponding to the received signal, and demodulate the constellation modulation signal to obtain received data;
wherein the receiving apparatus at least comprises: a signal receiving unit, an inverse mapping unit and a signal processing unit, wherein,
the signal receiving unit is configured to: convert an optical signal from a sending end into an electrical signal and then output the electrical signal to the inverse mapping unit;
the inverse mapping unit is configured to: according to an established mapping relationship between a constellation modulation signal and a location where the luminescent light source is located, map a location of the luminescent light source where the received optical signal is located to a constellation modulation signal corresponding to a constellation point, and output the obtained constellation modulation signal to the signal processing unit; wherein the luminescent light source in a sending end is placed according to a constellation diagram form of a constellation modulation;
the signal processing unit is configured to: perform processing on the constellation modulation signal from the inverse mapping unit to obtain the data sent by the sending end; wherein the processing comprises modulation and decoding;
wherein the received optical signal is processed by the sending end, which comprises: preprocessing the data to be sent and outputting the preprocessed data to be sent to a mapping unit of the sending end, and wherein the preprocessing comprises performing encoding and the constellation modulation.

18. The receiving apparatus according to claim 17,
wherein, the signal receiving unit is further configured to: perform filter shaping processing on the received optical signal,
or, wherein, the receiving apparatus is further configured to:
identify a location of each luminescent light source corresponding to each constellation point in different modulation modes by positioning a light source matrix, and establish a mapping relationship between a constellation modulation signal and a location where the luminescent light source is located consistent with that of a sending apparatus.

* * * * *